(12) United States Patent
Creed et al.

(10) Patent No.: US 12,093,536 B1
(45) Date of Patent: Sep. 17, 2024

(54) SELF-HEALING SERVICE LEVEL STORAGE

(71) Applicant: Dell Products L.P., Hopkinton, MA (US)

(72) Inventors: John Creed, Innishannon (IE); Owen Martin, Hopedale, MA (US)

(73) Assignee: Dell Products L.P., Hopkinton, MA (US)

(*) Notice: Subject to any disclaimer, the term of this patent is extended or adjusted under 35 U.S.C. 154(b) by 0 days.

(21) Appl. No.: 18/194,695

(22) Filed: Apr. 3, 2023

(51) Int. Cl.
*G06F 3/06* (2006.01)

(52) U.S. Cl.
CPC .......... *G06F 3/0619* (2013.01); *G06F 3/0631* (2013.01); *G06F 3/0689* (2013.01)

(58) Field of Classification Search
CPC ..... G06F 3/0619; G06F 3/0631; G06F 3/0689
USPC ......................................................... 711/114
See application file for complete search history.

(56) References Cited

U.S. PATENT DOCUMENTS

| | | | | |
|---|---|---|---|---|
| 9,665,303 B1* | 5/2017 | Huff | ...................... | G06F 3/0664 |
| 9,811,288 B1* | 11/2017 | Chen | ...................... | G06F 3/0679 |
| 11,144,396 B1* | 10/2021 | Hua | .................... | G06F 11/2094 |
| 11,256,447 B1* | 2/2022 | Pang | ...................... | G06F 3/0631 |
| 2019/0057004 A1* | 2/2019 | Tripathi | ................ | G06F 3/0689 |
| 2021/0286528 A1* | 9/2021 | Dalmatov | ............. | G06F 3/0632 |

* cited by examiner

*Primary Examiner* — Than Nguyen
(74) *Attorney, Agent, or Firm* — Anderson Gorecki LLP

(57) ABSTRACT

High priority host applications are protected from data loss associated with failure of multiple drives associated with the same protection group by preemptively relocating associated host application image data to protections groups that do not have failed drives. New storage allocations for the high priority host applications are preferentially located on protections groups that do not have failed drives. Following replacement of the failed drive, the preemptively relocated data and new allocations are redistributed across protection groups in a balanced manner. Protection groups are characterized as targets, sources, or neutral based on allocations of high priority host application image data relative to other protection groups. Sources and paired with targets and portions of the high priority host application image data are iteratively relocated until all protection groups are neutral.

20 Claims, 5 Drawing Sheets

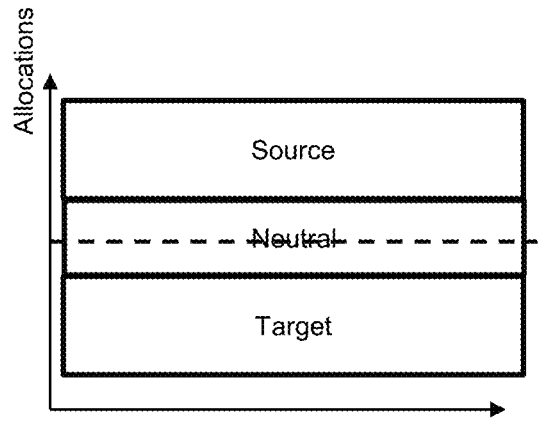
Figure 4A
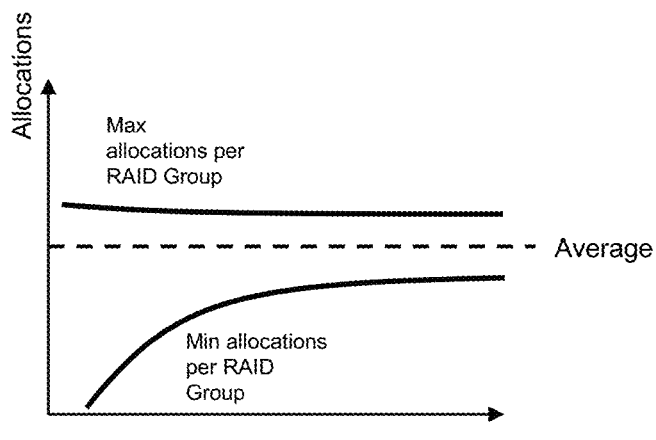
Figure 4B
Figure 4C

SELF-HEALING SERVICE LEVEL STORAGE

TECHNICAL FIELD

The subject matter of this disclosure is generally related to electronic data storage systems.

BACKGROUND

Organizational data storage systems such as storage area networks (SANs), network-attached storage (NAS), and storage arrays use redundant array of independent disks (RAID) protection groupings to avoid data loss. RAID protection groupings help to avoid data loss by distributing data across multiple drives in a way that enables a failed protection group member to be rebuilt from non-failed protection group members in the event of a drive failure. A RAID (D+P) protection group has D data members and P parity members. The data members contain data. The parity members contain parity information such as XORs of data values from the data members. The parity information enables reconstruction of the data values in the event that a data member fails. Parity information can be reconstructed from the data values on the data members in the event that a parity member fails. Most RAID levels can sustain a failure of one member without loss of data, but data loss can occur when two members of the same RAID protection group are in a failed state at the same time. Consequently, a race condition exists between rebuilding data and parity that was stored on a failed disk and the occurrence of a second disk failure associated with the same RAID protection group.

SUMMARY

In accordance with some aspects, an apparatus comprises a plurality of non-volatile drives on which protection groups of a selected type are implemented and on which data associated with a plurality of application images is stored; at least one compute node configured to manage access of the non-volatile drives, the at least one compute node comprising at least one processor and non-transitory computer-readable memory; and a self-healing controller configured to relocate data from at least one of the protection groups associated with a failed one of the drives to at least one of the protection groups that is not associated with the failed drive responsive to detection of failure of the failed drive.

In accordance with some aspects, a method comprises: detecting failure of one of a plurality of non-volatile drives on which protection groups of a selected type are implemented and data associated with application images is stored; and relocating data from at least one of the protection groups associated with the failed drive to at least one of the protection groups that is not associated with the failed drive responsive to detection of failure of the failed drive.

In accordance with some aspects, a non-transitory computer-readable storage medium stores instructions that when executed by a computer perform a method comprising: detecting failure of one of a plurality of non-volatile drives on which protection groups of a selected type are implemented and data associated with application images is stored; and relocating data from at least one of the protection groups associated with the failed drive to at least one of the protection groups that is not associated with the failed drive responsive to detection of failure of the failed drive.

All examples, aspects, implementations, and features mentioned in this disclosure can be combined in any technically possible way. Other aspects, features, and implementations may become apparent in view of the detailed description and figures.

BRIEF DESCRIPTION OF THE FIGURES

FIGS. 4A, 4B, and 4C illustrate rebalancing the distribution of relocated data after replacement of the failed drive.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. The term "data" is sometimes used herein to refer to data and associated parity information in a RAID group, as will be apparent to those of ordinary skill in the art from the context in which the term is used. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
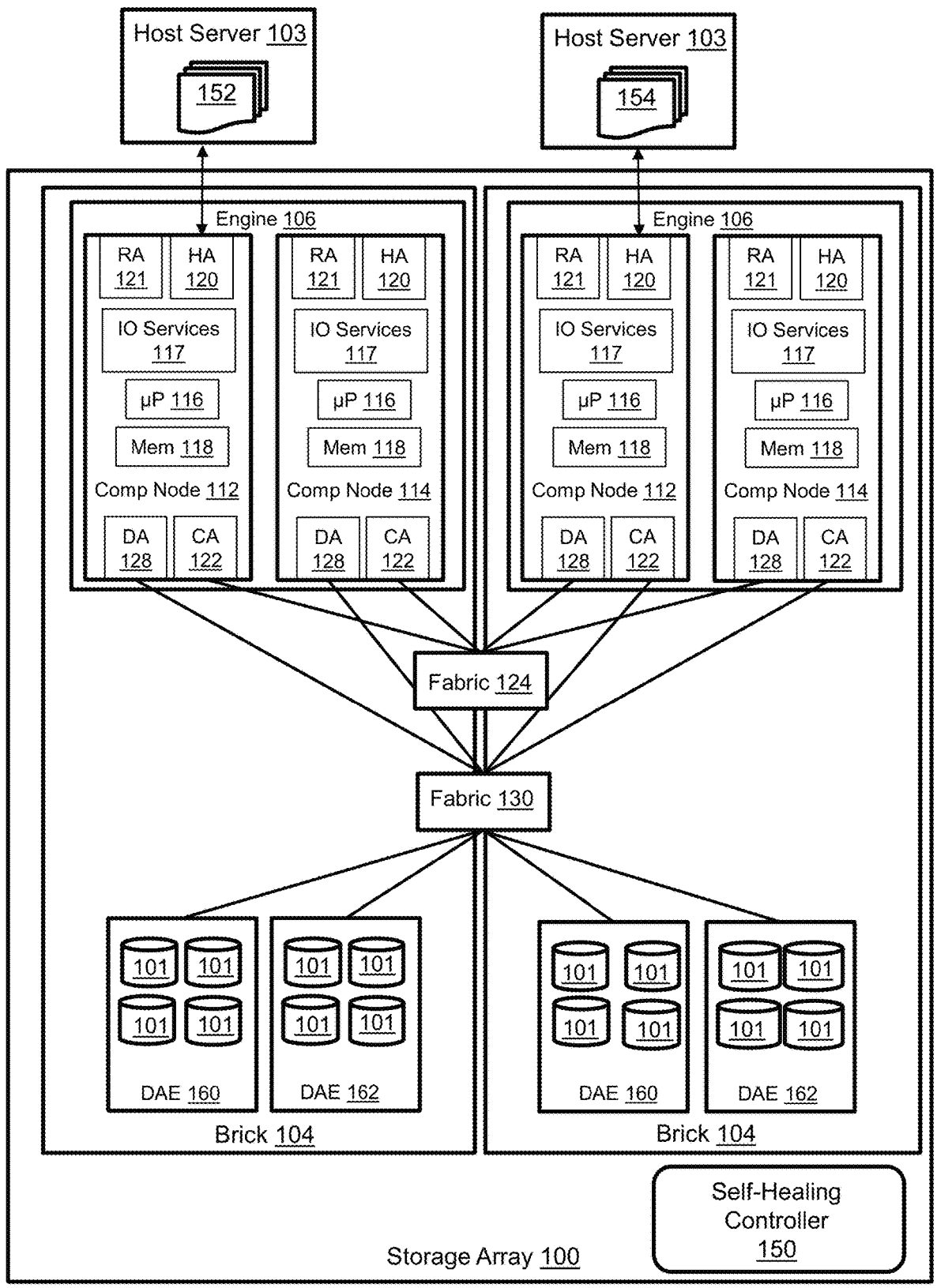
FIG. 1 illustrates a storage array with a self-healing controller that preemptively relocates data associated with high priority host applications out of RAID protection groups associated with a failed drive and subsequently rebalances distribution of the relocated data.

FIG. 1 illustrates a storage array 100 with a self-healing controller 150 that preemptively relocates data associated with high priority host applications out of RAID protection groups associated with a failed drive and subsequently rebalances distribution of the relocated data. The self-healing controller may be implemented as software, firmware, hardware, or any combination thereof, and be integrated into or run on any emulation of the storage array. The storage array is depicted in a simplified data center environment supporting two host servers 103 that run instances of different host applications 152, 154, but the storage array would typically support more than two host servers and more than two host applications. The host servers 103 include volatile memory, non-volatile storage, and one or more tangible processors. The storage array 100 includes one or more bricks 104. Each brick includes an engine 106 and one or more drive array enclosures (DAEs) 160, 162. Each engine 106 includes a pair of interconnected single-board compute nodes 112, 114 that are arranged in a failover relationship and may be referred to as "storage directors." Each compute node includes electronic hardware resources such as multi-core processors 116 and local memory 118. The processors may include multiple dies in multiple sockets with central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by other compute nodes of the storage array via direct memory access (DMA). Managed drives 101 in the DAEs 160, 162 include non-volatile storage media that may be, but is not necessarily, of a single technology type and storage capacity, where technology types may include, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active backend. Every drive adapter 128 in the storage array can reach every DAE via the fabric 130.

Each compute node 112, 114 includes emulation modules that may run on virtual machines or guest operating systems under a hypervisor or in containers. Front-end emulation modules include a host adapter (HA) 120 and a remote adapter (RA) 121. The host adapter handles communications with the host servers 103. The remote adapter (RA) 121 handles communications with other storage systems, e.g., for remote mirroring, backup, and replication. Back-end emulation modules include a channel adapter (CA) 122 and a drive adapter (DA) 128. The channel adapter 122 handles communications with other compute nodes via an interconnecting fabric 124. The drive adapter 128 handles communications with managed drives 101 in the DAEs 160, 162. An IO services adapter 117 performs a variety of functions in support of servicing IOs from the host servers and performs storage array management tasks. The emulation modules running on the compute nodes may have exclusive allocations of the local processor cores and local memory resources.

Figure 2:
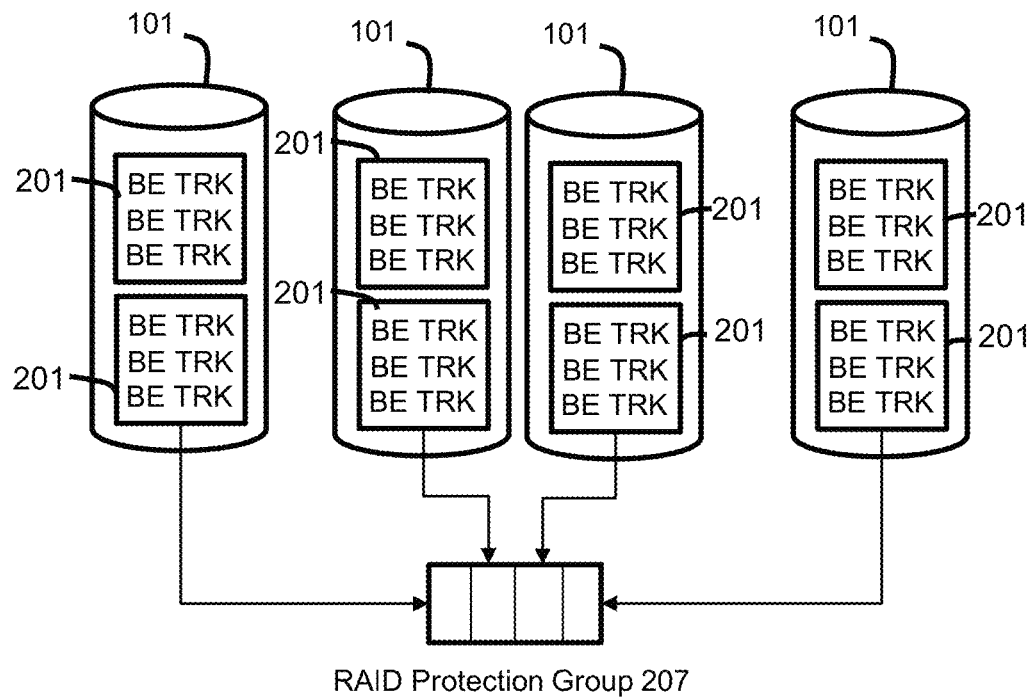
FIG. 2 illustrates the relationship between managed drives and a host application image.
Figure 2:
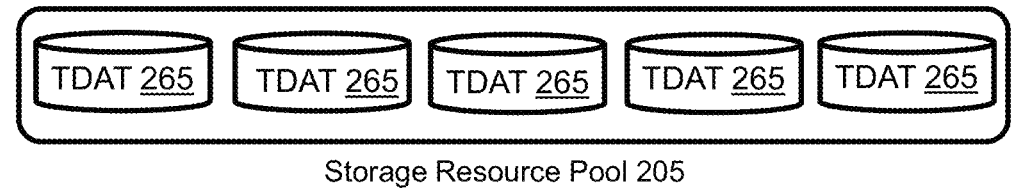
Figure 2:
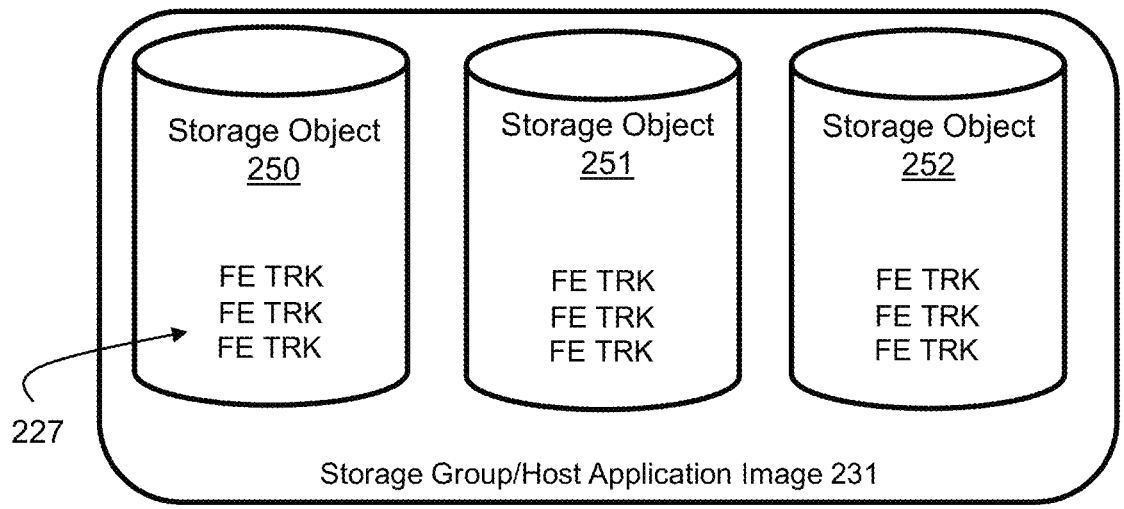

Referring to FIGS. 1 and 2, data associated with instances of the host applications 152, 154 running on the host servers 103 is maintained on the managed drives 101. The managed drives are not discoverable by the host servers, so the storage array creates logical production storage objects 250, 251, 252 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 103, each production storage object is a single disk drive having a set of contiguous fixed-size logical block addresses (LBAs) on which data used by the instances of one of the host applications resides. However, the host application data is stored at non-contiguous addresses on various managed drives 101.

The IO services emulations 117 maintain metadata that maps between the logical block addresses of the production storage objects 250, 251, 252 and physical addresses on the managed drives 101 in order to process IOs from the host servers. The basic allocation unit of storage capacity that is used by the compute nodes 112, 114 to access the managed drives 101 is a back-end track (BE TRK). The managed drives are organized into same-size splits 201, each of which may contain multiple BE TRKs. A grouping of splits 201 from different managed drives 101 is used to create a RAID protection group 207 with each split containing a protection group member. A storage resource pool 205 is a type of storage object that includes a collection of protection groups of the same RAID level, e.g., RAID-5 (3+1), on thinly provisioned logical data devices (TDATs) 265 that are used to create the production storage objects 250, 251, 252. The host application data is logically stored in front-end tracks (FE TRKs) on the production storage objects. The FE TRKs of the production storage objects are mapped to the BE TRKs on the managed drives and vice versa by tables and pointers that are maintained in the shared memory. A storage group 231 contains multiple production storage objects associated with an individual host application. The storage group may be a replication consistency group, and the data stored therein may be referred to as a host application image. Multiple instances of a single host application 152 may use the same storage group 231, but instances of different host applications 152, 154 do not use the same storage group 231. The storage array may maintain any number of production storage objects and storage groups.

Figure 3:
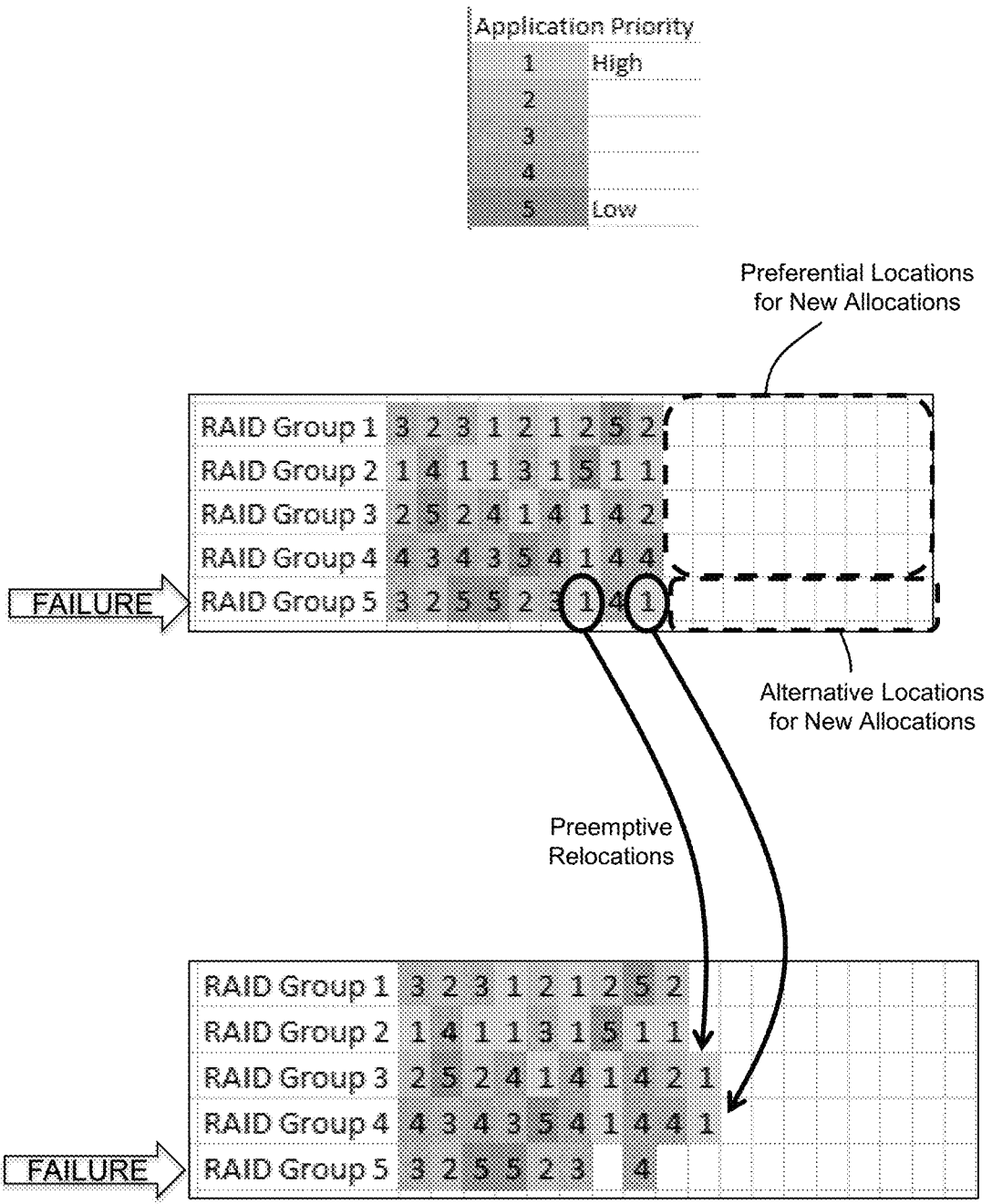
FIG. 3 illustrates preemptive relocation of high priority host application data out of a RAID group associated with a failed drive.

FIG. 3 illustrates preemptive relocation of high priority host application data out of a RAID group associated with a failed drive. Each host application is assigned a priority indicator, e.g., from 1 to 5, with 1 corresponding to the highest priority and 5 corresponding to the lowest priority. For example, host application 152 (FIG. 1) may be assigned priority 1 and host application 154 (FIG. 1) may be assigned priority 5. The storage capacity of the managed drives is represented by a matrix of indexed drive subdivision columns and RAID group rows. Subdivisions that have been allocated for storage of data are represented by the priority indicator of the associated host application. Subdivisions that have not been allocated for storage of data are shown as empty. In the illustrated example a drive failure occurs in RAID group 5. For example, the failed drive may be a member of RAID group 5 or splits of the failed drive may be members of RAID group 5. Initially, RAID group 5 includes data associated with host applications of priority 5, 4, 3, 2, and 1. The two instances of data associated with priority 1 are selected and preemptively relocated to unallocated subdivisions in RAID groups that do not have failed drives, e.g., RAID group 3 and RAID group 4. A priority level threshold may be selected to indicate which data is protected by preemptive relocation and which data is not protected by preemptive relocation. For example, only priority 1 data could be protected, or only priority 1 and 2 data could be protected, and so forth. For ease of explanation, only priority 1 data will be described as being protected and later rebalanced in the description below. Preemptive relocation of the data associated with priority 1 host applications helps to avoid loss of that priority 1 data in the event of a second drive failure in RAID group 5 before the first failed drive is replaced and rebuilt. Protecting only selected host applications with preemptive relocation helps to reduce write amplification relative to protection of all data.

In the interval between the time at which the drive failure occurs and the time at which the failed drive is replaced there will typically be a need for new allocations of empty subdivisions for storage of data. Data associated with a priority level that is protected by preemptive relocation is preferentially stored in RAID groups that do not have failed drives during that interval. However, if no free subdivisions are available in RAID groups that do not have failed drives, then the data is stored in the compromised RAID group. Data that is not associated with a priority level that is protected by preemptive relocation may be stored in any RAID group or preferentially stored in RAID groups that do not have failed drives during that time interval, according to configuration settings.

FIGS. 4A, 4B, and 4C illustrate rebalancing the distribution of relocated data after replacement of the failed drive. In general, parallelization of drive accesses tends to reduce data access latency so the temporarily relocated priority 1 data is redistributed across RAID groups in a balanced manner. Each RAID group is characterized as being a source, target, or neutral based on how many subdivisions are allocated for data of a protected priority level, e.g., priority 1, relative to the other RAID groups. Neutral is characterized by a range relative to the average number of subdivisions allocated for the priority 1 data. A source is characterized by more priority 1 data allocations than neutral, and a target is characterized by fewer priority 1 data allocations than neutral. As specifically shown in FIG. 4B, RAID group 2, which has six allocated subdivisions of priority 1 data, is characterized as a source, whereas RAID group 4 which has only one allocated subdivision of priority 1 data is characterized as a target. As such, RAID group 2 and RAID group 4 may be matched as a source-target pair for rebalance of priority 1 data. As specifically shown in FIG. 4C, subdivisions of priority 1 data are gradually relocated from source RAID groups to target RAID groups to achieve balance, where balance may be defined as all RAID groups being neutral or as close to neutral as possible. If a source RAID group cannot be matched with a target RAID group, then a neutral RAID group may be used as the target RAID group.

Figure 5:
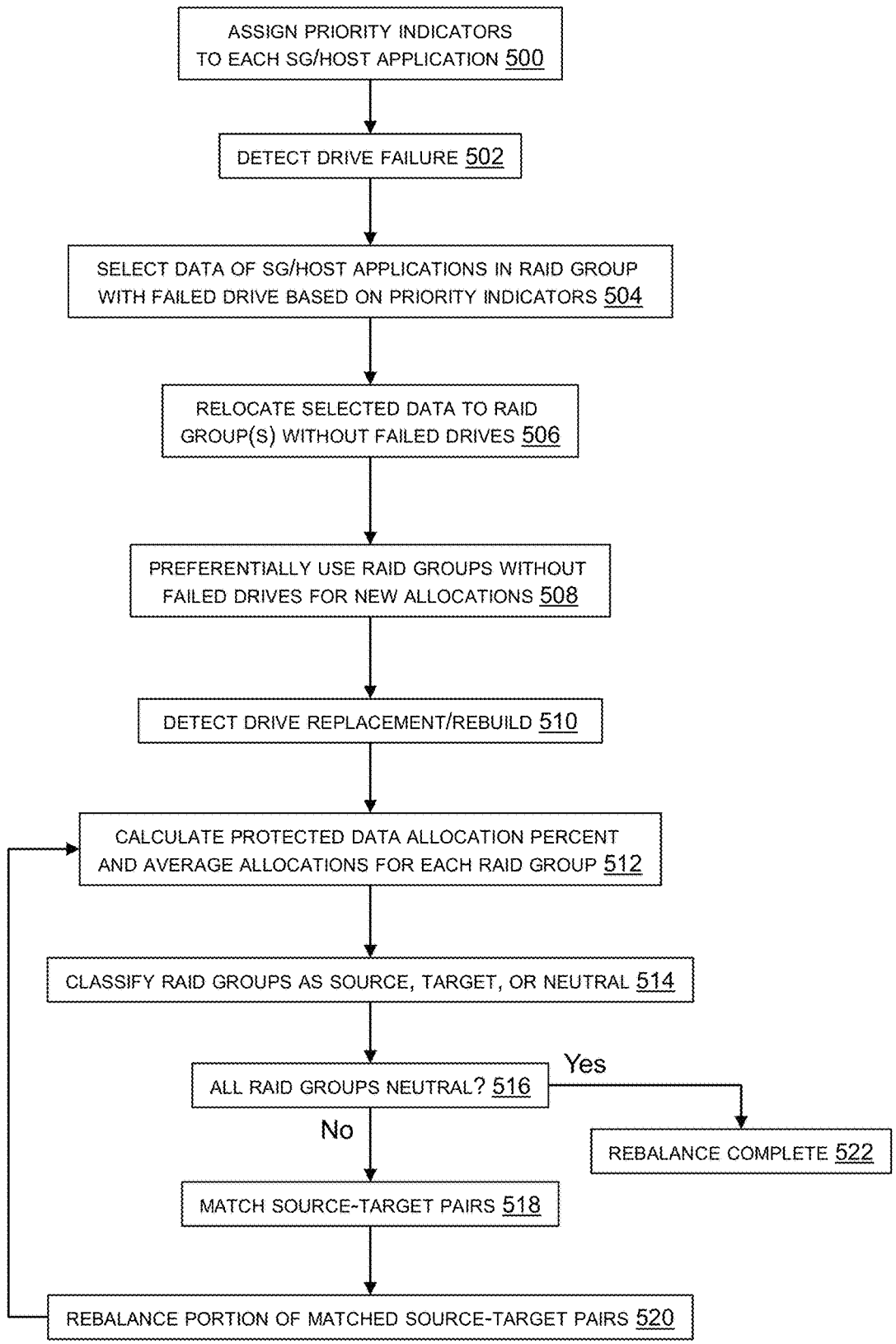
FIG. 5 illustrates a method for preemptively relocating data associated with high priority applications out of RAID protection groups associated with a failed drive and subsequently rebalancing distribution of the relocated data.

FIG. 5 illustrates a method for preemptively relocating data associated with high priority applications out of RAID protection groups associated with a failed drive and subsequently rebalancing distribution of the relocated data. Step 500 is assigning priority indicators to each host application to differentiate data that is protected by preemptive relocation from data that is not protected by preemptive relocation. Because storage groups and host application images are representative of host applications from the perspective of the storage array, the priority indicators may be associated with the storage groups or host application images. The step of assigning the priority indicators may include designating which priority level or levels are protected by preemptive relocation and which priority level or levels are not protected by preemptive relocation. When a drive failure is detected as indicated in step 502, data associated with host applications that are protected by preemptive relocation is selected as indicated in step 504. For example, all priority 1 data in the RAID group or RAID groups associated with the failed drive is selected in the case in which only priority 1 host applications are protected by preemptive relocation. The selected data is relocated to one or more RAID groups that do not have a failed drive as indicated in step 506. The priority 1 data is thereby isolated from the race condition of the compromised RAID group. During the interval of time between the drive failure and replacement of the failed drive, new allocations are preferentially located in RAID groups that do not have a failed drive as indicated in step 508. Such preferential location may be implemented for only the data associated with protected host applications or data associated with all host applications in accordance with configuration settings. If there are no free subdivisions available in RAID groups without a failed drive, then the RAID group with the failed drive is used for the new allocation.

Rebalance is initiated when replacement of the failed drive is detected as indicated in step 510. The failed drive may be rebuilt on the replacement drive while the relocated data is rebalanced. Step 512 is calculating average and percent allocations of protected data of a given protected priority level for each RAID group. For example, a RAID group that has 10 allocated subdivisions including 3 subdivisions allocated for protected priority level 1 data would have 30% protected priority 1 data. The average is calculated as the average of the number of subdivisions allocated for protected data of that level for all RAID groups. Each protected priority level is rebalanced independently. Step 514 is classifying each RAID group as a source, target, or neutral. RAID groups within a predetermined range relative to the average, e.g., average +/−5%, are characterized as neutral. RAID groups with protected data allocations greater than the neutral range are characterized as sources. RAID groups with protected data allocations less than the neutral range are characterized as targets. Step 516 is determining whether all RAID groups are characterized as neutral, which is unlikely in the initial iteration. Step 518 is matching source RAID groups with target RAID groups as source-target pairs. If there are more source RAID groups than target RAID groups, then neutral RAID groups are selected and paired with the source RAID groups for which matching target RAID groups are unavailable. Step 520 is rebalancing a portion of the matched source-target pairs by relocating protected data from the source RAID group to the paired target RAID group. Steps 512 through 520 are iterated until all RAID groups are neutral, at which point rebalance is complete as indicated in step 522.

The partial rebalance in step 520 may be configured to reduce the likelihood of overshoot and oscillation. In some implementations the amount of protected data that is rebalanced in a single iteration is calculated based on half the absolute difference between storage group allocations and the average. For example, if the average number of protected subdivision allocations of all RAID groups is 300, the neutral characterization corresponds to a range of 285–315 subdivisions allocated for protected data, and a source RAID group having 500 subdivisions allocated for protected data is paired with a target RAID group having 0 subdivisions allocated for protected data, then the maximum number of protected data subdivisions that could be moved from the source RAID group is calculated as (500−300)/2=100 and the maximum number of protected data subdivisions that could be moved into the target RAID group is calculated as (300−0)/2=150. In that case, no more than 100 protected data subdivisions are moved in the iteration in order to avoid exceeding the calculated limits.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
a plurality of non-volatile drives on which protection groups of a selected type are implemented and on which data associated with a plurality of application images is stored;
at least one compute node configured to manage access of the non-volatile drives, the at least one compute node comprising at least one processor and non-transitory computer-readable memory; and
a self-healing controller configured to relocate data from at least one of the protection groups associated with a failed one of the drives to at least one of the protection groups that is not associated with the failed drive responsive to detection of failure of the failed drive.

2. The apparatus of claim 1 further comprising the self-healing controller being configured to relocate only data associated with ones of the application images having a designated priority from the at least one protection group associated with the failed drive to the at least one protection group that is not associated with the failed drive responsive to detection of failure of the failed drive.

3. The apparatus of claim 2 further comprising the self-healing controller being configured to redistribute the relocated data across protection groups in a balanced manner responsive to the failed one of the drives being replaced with a new drive.

4. The apparatus of claim 3 further comprising the self-healing controller being configured to preferentially locate new allocations for data associated with the application images having the designated priority on protection groups that are not associated with the failed drive during an interval between detection of failure of the failed drive and replacement of the failed drive.

5. The apparatus of claim 4 further comprising the self-healing controller being configured to characterize ones of the protection groups as a source, a target, or a neutral based on a number of allocations for data associated with the application images having the designated priority relative to other ones of the protection groups.

6. The apparatus of claim 5 further comprising the self-healing controller being configured to match source protection groups with target protection groups as pairs and redistribute the relocated data from the source protection groups to the target protection groups in a balanced manner responsive to the failed one of the drives being replaced with the new drive.

7. The apparatus of claim 6 further comprising the self-healing controller being configured to iteratively redistribute a portion of the relocated data based on half the absolute difference between protection group allocations and average allocations for data associated with the application images having the designated priority relative to other ones of the protection groups until all protection groups are characterized as neutral.

8. A method comprising:
detecting failure of one of a plurality of non-volatile drives on which protection groups of a selected type are implemented and data associated with application images is stored; and
relocating data from at least one of the protection groups associated with the failed drive to at least one of the protection groups that is not associated with the failed drive responsive to detection of failure of the failed drive.

9. The method of claim 8 further comprising relocating only data associated with ones of the application images having a designated priority from the at least one of the protection groups associated with the failed drive to the at least one of the protection groups that is not associated with the failed drive responsive to detection of failure of the failed drive.

10. The method of claim 9 further comprising redistributing the relocated data across protection groups in a balanced manner responsive to the failed one of the drives being replaced with a new drive.

11. The method of claim 10 further comprising preferentially locating new allocations for data associated with the application images having the designated priority on protection groups that are not associated with the failed drive during an interval between detection of failure of the failed drive and replacement of the failed drive.

12. The method of claim 11 further comprising characterizing ones of the protection groups as a source, a target, or a neutral based on a number of allocations for data associated with the application images having the designated priority relative to other ones of the protection groups.

13. The method of claim 12 further comprising matching source protection groups with target protection groups as pairs and redistributing the relocated data from the source protection groups to the target protection groups in a balanced manner responsive to the failed one of the drives being replaced with the new drive.

14. The method of claim 13 further comprising iteratively redistributing a portion of the relocated data based on half the absolute difference between protection group allocations and average allocations for data associated with the application images having the designated priority relative to other ones of the protection groups until all protection groups are characterized as neutral.

15. A non-transitory computer-readable storage medium with instructions that when executed by a computer perform a method comprising:
detecting failure of one of a plurality of non-volatile drives on which protection groups of a selected type are implemented and data associated with application images is stored; and
relocating data from at least one of the protection groups associated with the failed drive to at least one of the protection groups that is not associated with the failed drive responsive to detection of failure of the failed drive.

16. The non-transitory computer-readable storage medium of claim 15 in which the method further comprises relocating only data associated with ones of the application images having a designated priority from at least one of protection groups associated with the failed drive to the at least one of the protection groups that is not associated with the failed drive responsive to detection of failure of the failed drive.

17. The non-transitory computer-readable storage medium of claim 16 in which the method further comprises redistributing the relocated data across protection groups in a balanced manner responsive to the failed one of the drives being replaced with a new drive.

18. The non-transitory computer-readable storage medium of claim 17 in which the method further comprises preferentially locating new allocations for data associated with the application images having the designated priority on protection groups that are not associated with the failed drive during an interval between detection of failure of the failed drive and replacement of the failed drive.

19. The non-transitory computer-readable storage medium of claim 18 in which the method further comprises characterizing ones of the protection groups as a source, target, or neutral based on a number of allocations for data associated with the application images having the designated priority relative to other ones of the protection groups.

20. The non-transitory computer-readable storage medium of claim 19 in which the method further comprises matching source protection groups with target protection groups as pairs and redistributing the relocated data from the source protection groups to the target protection groups in a balanced manner responsive to the failed one of the drives being replaced with the new drive.

* * * * *